W. J. KENNY.
DEVICE FOR ATTACHING BAILS TO CONTAINER BODIES.
APPLICATION FILED AUG. 18, 1917.
1,343,920.
Patented June 22, 1920.
2 SHEETS—SHEET 1.
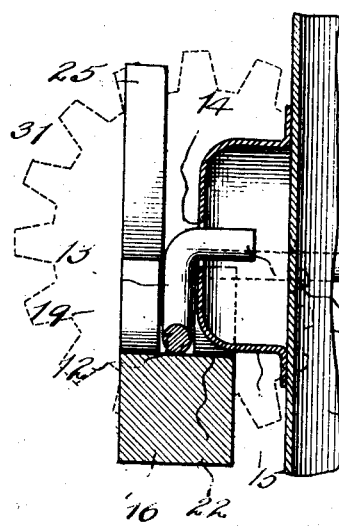
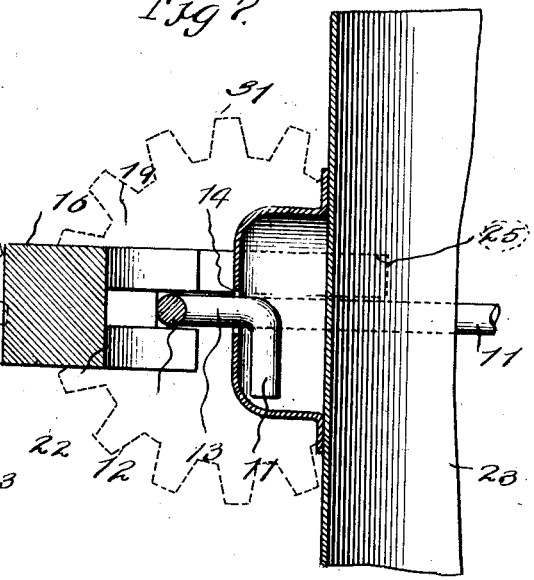
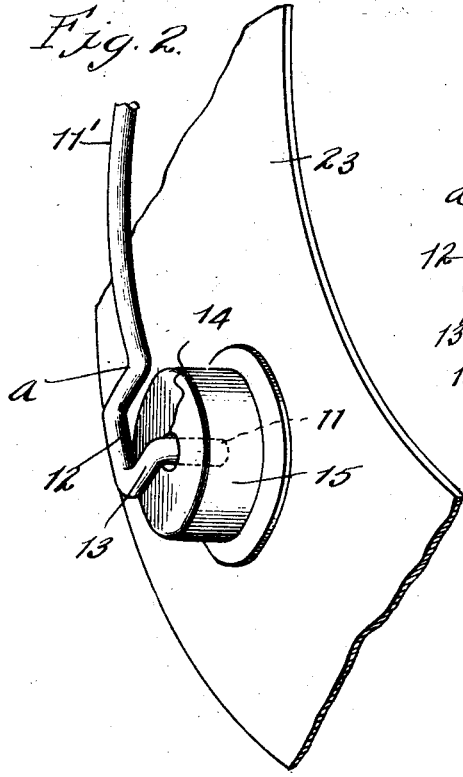
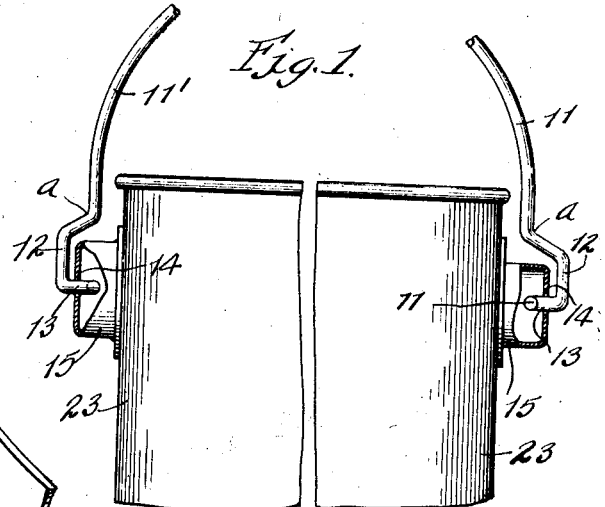
Inventor
William J. Kenny
Munday, Clarke
By —& Carpenter Attys.

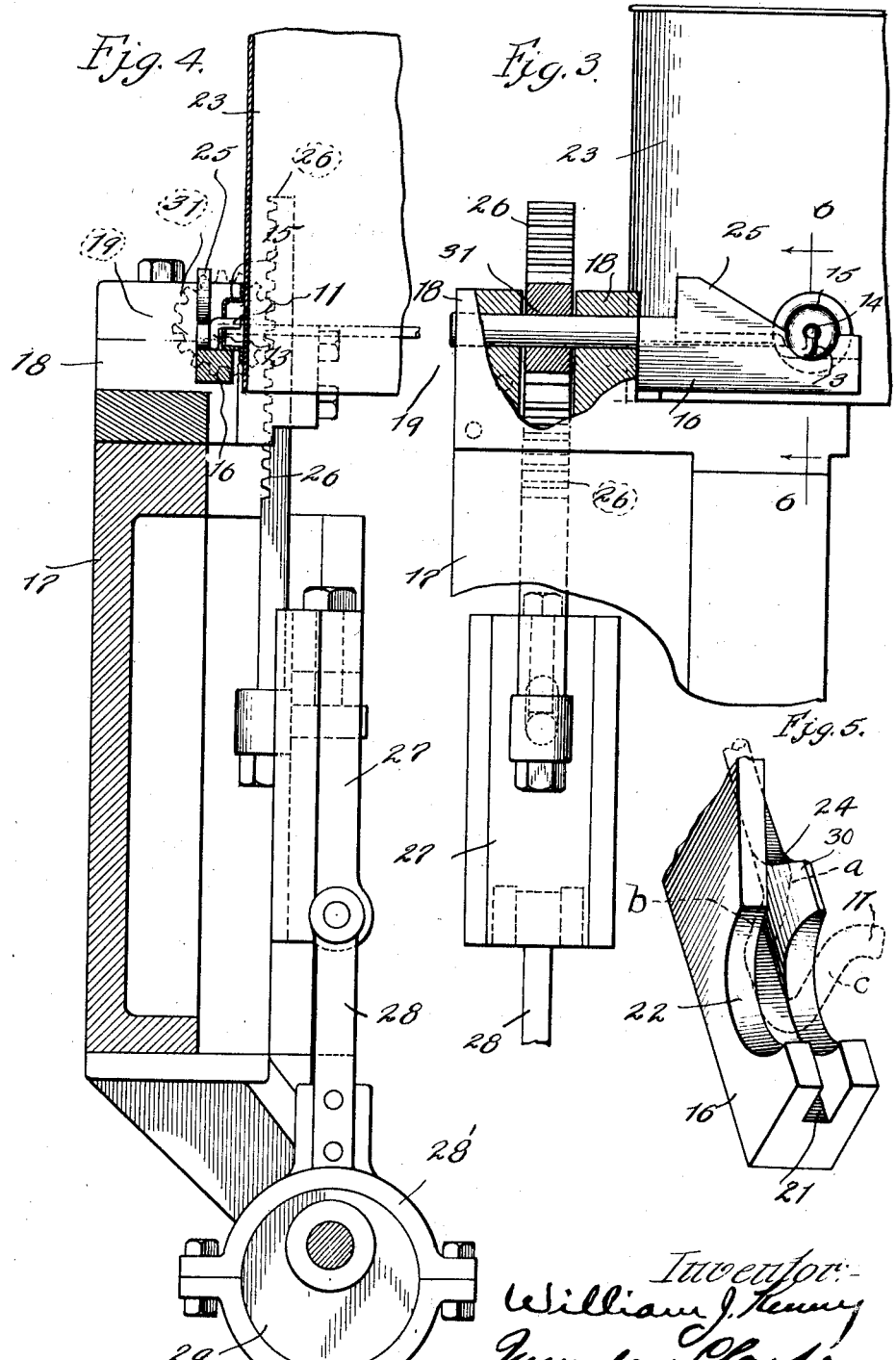

UNITED STATES PATENT OFFICE.

WILLIAM J. KENNY, OF CICERO, ILLINOIS, ASSIGNOR TO AMERICAN CAN COMPANY, OF NEW YORK, N. Y., A CORPORATION OF NEW JERSEY.

DEVICE FOR ATTACHING BAILS TO CONTAINER-BODIES.

1,343,920.  Specification of Letters Patent.  Patented June 22, 1920.

Application filed August 18, 1917. Serial No. 187,009.

*To all whom it may concern:*

Be it known that I, WILLIAM J. KENNY, a citizen of the United States, residing at Cicero, in the county of Cook and State of Illinois, have invented a new and useful Improvement in Devices for Attaching Bails to Container-Bodies, of which the following is a specification.

This invention relates in general to the assembling of bails on container bodies and has more particular reference to the assembling of bails of the character described in the co-pending application of James H. Doyle and myself filed August 18, 1917, Serial No. 186,873.

The invention has for its principal object the provision of a simple process and machine for attaching bails of the character described in the application mentioned to the container body.

A further object of the invention is the provision of a process which will permit the assembling of such bails without requiring complicated or expensive mechanism or the attention of skilled mechanics.

Other objects and advantages of the invention will be apparent as it is better understood from the following description when considered in connection with the accompanying drawing illustrating a preferred embodiment thereof.

On the drawing,

Figure 1 is an elevation, partly broken away, of a container having bail ears partly in section, and a bail united therewith.

Fig. 2 is a perspective view of one of said bail ears and a portion of the bail inserted in said ear but not yet bent or twisted to locked position.

Fig. 3 is an end elevation shown partly in section of a machine adapted to complete the assembling;

Fig. 4 is a section taken transversely of the machine;

Fig. 5 is an enlarged detail view of the device for clamping the bail in the final assembling operation;

Fig. 6 is a section taken substantially on the line 6—6 of Fig. 3; and

Fig. 7 is a similar section showing the parts after the operation is complete.

The bail 11' adapted to be assembled by the particular machine used to illustrate the present invention, is shown in Fig. 1 from which it will be noted that the two ends 11 are adapted to extend at right angles to the plane of the bail when in attached relation. Just outwardly of the ends 11 are provided two rectangular loops 12 which are disposed in the plane of the bail, the lower part 13 of the wire of each loop extending through the opening 14 in the bail ear 15. The bail thus constructed is assembled in the following manner:

One loop 12 is in the construction of the bail before attachment disposed at right angles to its normal position, *i. e.* at right angles to the plane of the body of the bail and its end 11 is also at right angles to its normal position. The bail is positioned by inserting the end of the bail having the loop in the plane of the body through its bail ear and then turning the bail until the end at the other side can be inserted. The assembling or attachment is completed thereafter by bending the loop at the last mentioned side at right angles to itself to dispose the end 11 completely within the ear and the part 13 of the loop passing through the aperture. The first of these operations can be quickly and easily accomplished by hand and to facilitate the operation of the last or final step I have provided a machine for the bending of the loop as already described.

This machine consists of a holding or clamping block or device 16 together with suitable means for turning it after it has engaged the bail.

On the drawings reference character 17 indicates a main frame of the machine having bearing brackets 18 at its top. Through these bearing brackets a shaft 19 extends and on the end of this shaft the block 16 is secured. This block, in the present instance, is provided with a central channel 21 and is cut away transversely to provide grooved walls 22 in which the bail ear may rest with the loop disposed in the channel as may be observed on viewing Figs. 3 and 5. The side of the block adjacent the container 23 is cut away at 24 to permit the body of the bail to pass from under the influence of the holding device. The bend is effected about the axis of the leg of the bail at the point *a* and it is only necessary that the holding device clamp the loop when it turns. The side of the holding device away from the container is extended upwardly as indicated at 25 to prevent the bail sliding out of the channel. In this movement the bail is clamped between the outer channel wall, Fig. 6 (which becomes the top channel wall, Fig. 7) at *b* and the inner channel wall (which becomes the bottom wall) at *c*. When the clamping device starts its return movement the assembled bail is released and slides out of the channel over the curved surface 30. The shaft 14 is caused to oscillate by a rack 26 connected to a slide 27 moving in ways 27′ and an eccentric rod 28 of an eccentric sleeve 28′ on an eccentric 29. The rack 26 meshes with a pinion 31 on the shaft 19 so that reciprocation of the rack 26 produces the desired oscillation of the holding device 16. The bending action may be completely observed from Figs. 6 to 7 which also show the method of insertion of the end of the bail. Viewing Fig. 6 it will be noted that the end 11 extends through the aperture 14 and that after the loop 12 has been bent through an angle of 90° its part 13 extends therethrough.

It is thought that the invention and many of its attendant advantages will be understood from the foregoing description, and it will be apparent that various changes may be made in the form, construction and arrangement of the parts without departing from the spirit and scope of the invention or sacrificing most of its material advantages, the form hereinbefore described being merely a preferred embodiment thereof.

I do not herein claim the method which forms a part of my invention, the same being the subject of my application Serial No. 346,717, filed December 22, 1919.

I claim:

1. In a machine for assembling bails with containers having bail ears, the combination of a rotary member having a recess for holding the leg of the bail and walls for engaging on opposite sides of the loop of the bail, said rotary member having an axis in substantial line with which the leg of the bail is held by said recess, and means for turning said rotary member to twist the loop relative to the leg and bring the end of the bail while within the bail ear from a position substantially parallel with the body of the bail to a position substantially at right angles to the body of the bail.

2. In a machine for assembling bails with containers having bail ears, the combination of a rotary member having a recess for holding the leg of the bail and walls for engaging on opposite sides of the loop of the bail, one of said walls having a recess to receive the bail ear, said rotary member having an axis in substantial line with which the leg of the bail is held by said recess, and means for turning said rotary member to twist the loop relative to the leg and bring the end of the bail while within the bail ear from a position substantially parallel with the body of the bail to a position substantially at right angles to the body of the bail.

3. A rotary member having means for holding the opposite sides of the loop of a bail, while the end of said bail is inclosed within a bail ear, and having means for holding the leg of the bail, said rotary member having an axis arranged substantially in line with the leg of the bail, and means for turning said rotary member to twist said loop relative to said leg, to lock the end of the bail within the bail ear.

4. A rotary member having walls adapted to engage the opposite sides of a bail loop adjacent the end of the leg of the bail, said member having an axis arranged substantially in line with the leg of the bail, one of said walls having a space to receive a bail ear inclosing the end of the bail, and means for turning said member on said axis to twist the loop and lock the end of the bail within the bail ear.

WILLIAM J. KENNY.

Witnesses:
J. C. CARPENTER,
F. J. O'BRIEN.